US010641234B2

(12) United States Patent
Dudar

(10) Patent No.: US 10,641,234 B2
(45) Date of Patent: May 5, 2020

(54) METHOD FOR ENGINE LASER IGNITION SYSTEM

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 353 days.

(21) Appl. No.: 15/822,525

(22) Filed: Nov. 27, 2017

(65) Prior Publication Data

US 2019/0162159 A1 May 30, 2019

(51) Int. Cl.
| | |
|---|---|
| *F02P 23/04* | (2006.01) |
| *F02D 41/22* | (2006.01) |
| *F02D 35/02* | (2006.01) |
| *F02P 17/00* | (2006.01) |
| *F02D 27/00* | (2006.01) |
| *F02M 35/10* | (2006.01) |
| *F02N 11/00* | (2006.01) |
| *B60W 20/40* | (2016.01) |
| *F02D 29/02* | (2006.01) |
| *F02D 13/02* | (2006.01) |
| *F02D 41/04* | (2006.01) |
| *G05D 1/00* | (2006.01) |

(52) U.S. Cl.
CPC ............ *F02P 23/04* (2013.01); *B60W 20/40* (2013.01); *F02D 13/0265* (2013.01); *F02D 27/00* (2013.01); *F02D 29/02* (2013.01); *F02D 35/027* (2013.01); *F02D 41/22* (2013.01); *F02M 35/1038* (2013.01); *F02N 11/003* (2013.01); *F02P 17/00* (2013.01); *F02D 41/042* (2013.01); *F02D 2041/228* (2013.01); *F02D 2200/0414* (2013.01); *F02D 2200/0418* (2013.01); *F02D 2200/1015* (2013.01); *F02D 2200/70* (2013.01); *G05D 1/0088* (2013.01)

(58) Field of Classification Search
CPC .. F02P 23/04; F02P 17/00; F02P 17/02; F02D 35/025; F02D 41/22; F02D 41/221
See application file for complete search history.

(56) References Cited

U.S. PATENT DOCUMENTS

| | | |
|---|---|---|
| 6,763,298 B2 | 7/2004 | Boggs et al. |
| 7,797,993 B2 | 9/2010 | McLain et al. |
| | | (Continued) |

FOREIGN PATENT DOCUMENTS

JP 2010138796 A 6/2010

OTHER PUBLICATIONS

Marshall, L., "Laser Car Ignition Dream Sparks Multiple Approaches," Photonics Media Website, Available Online at http://www.photonics.com/Article.aspx?AID=51731, Sep. 2012, 8 pages.

(Continued)

*Primary Examiner* — Sizo B Vilakazi
*Assistant Examiner* — Anthony L Bacon
(74) *Attorney, Agent, or Firm* — Geoffrey Braumbaugh McCoy Russel LLP

(57) ABSTRACT

Methods and systems are provided for diagnosing a laser ignition system of an engine. In one example, a controller may operate the laser in a sealed cylinder hours after key-off. Then, the cylinder may be unsealed and a change in exhaust temperature may be correlated with laser functionality.

20 Claims, 6 Drawing Sheets

(56) References Cited

U.S. PATENT DOCUMENTS

| | | |
|---|---|---|
| 8,234,038 B2 | 7/2012 | McLain et al. |
| 8,297,248 B2 | 10/2012 | Martin et al. |
| 8,739,766 B2 | 6/2014 | Jentz et al. |
| 9,114,766 B1 | 8/2015 | Pelini |
| 9,212,970 B2 | 12/2015 | Martin et al. |
| 9,617,967 B2 | 4/2017 | Martin et al. |
| 10,118,608 B1* | 11/2018 | Dudar .................. F02P 17/00 |
| 2006/0032471 A1* | 2/2006 | Yalin .................. F02P 23/04 |
| | | 123/143 B |
| 2006/0037572 A1* | 2/2006 | Yalin .................. F02D 35/022 |
| | | 123/143 B |
| 2012/0051388 A1 | 3/2012 | Hamama et al. |
| 2014/0136085 A1* | 5/2014 | Martin .................. F02P 5/152 |
| | | 701/111 |
| 2014/0316622 A1* | 10/2014 | Martin .................. B60W 10/06 |
| | | 701/22 |
| 2015/0005997 A1* | 1/2015 | Martin .................. F02P 23/04 |
| | | 701/22 |
| 2015/0198136 A1* | 7/2015 | Martin .................. F02D 41/009 |
| | | 356/72 |
| 2016/0040644 A1 | 2/2016 | Martin et al. |
| 2018/0010532 A1 | 1/2018 | Dudar |

OTHER PUBLICATIONS

"Ignition Systems of the Future," Part Info Website, Retrieved Jan. 18, 2018 at http://www.partinfo.co.uk/articles/218, Available as Early as Jan. 2, 2014, 5 pages.

Dudar, A., "System and Methods for Diagnosing a Vehicle Engine Intake Manifold and Exhaust System," U.S. Appl. No. 15/657,655, filed Jul. 24, 2017, 68 pages.

Dudar, A., "System and Methods for Diagnosing a Vehicle Engine Intake Manifold and Exhaust System," U.S. Appl. No. 15/804,359, filed Nov. 6, 2017, 91 pages.

\* cited by examiner

METHOD FOR ENGINE LASER IGNITION SYSTEM

FIELD

The present description relates to methods and systems for a laser ignition system.

BACKGROUND/SUMMARY

Engine systems on vehicles, such as hybrid electric vehicles (HEV) and vehicles configured for idle-stop operations, may be configured with a laser ignition system. The laser ignition system includes a laser coupled to each combustion chamber for igniting fuel. In addition to initiating cylinder combustion, the laser ignition system may also be used during engine starting to accurately determine the position of a piston in each cylinder. Laser ignition systems may provide various advantages over spark plugs which tend to degrade over time due to chemical changes at the cathode/anode and accumulation of particulate matter.

Laser ignition systems may also be used for misfire detection. One example approach is shown by Martin et al. in U.S. 20160040644. Therein, after a laser ignition system is used to ignite an air-fuel mixture in a cylinder, a temperature profile of the cylinder is sensed over the combustion event via an infra-red sensor. A misfire event is then determined based on the generated temperature profile relative to an expected profile.

However, the inventors herein have identified a potential issue with such an approach. A misfire may be identified when the cylinder does not produce sufficient torque. There may be various reasons for a cylinder to misfire, and a controller may perform different misfire mitigating actions based on the nature of the misfire. In the approach of Martin, if the laser device of the laser ignition system is degraded, the cylinder will also not produce any torque on a combustion event, generating a misfire. Consequently, the controller may be confounded as to the reason for the misfire. For example, it may be difficult for the controller to determine if the misfire was due to laser ignition system degradation, an air-fuel mixture having a richer than intended (e.g., richer than stoichiometric) air-fuel ratio, weak cylinder combustion (due to leaky intake or exhaust valves, for example), a leaky/plugged fuel injector, moisture/humidity in the cylinder, bad fuel quality, hot cylinder walls, leaky canister purge valve, excess EGR flow, etc.

In one example, the above issue may be addressed by a method for diagnosing the laser ignition system so as to differentiate laser degradation induced cylinder misfire from other misfire causes. One example method includes spinning an engine in reverse, unfueled, to establish a baseline intake air temperature and then sealing a cylinder at a position of negative valve overlap; operating a laser ignition device in the sealed cylinder; spinning the engine in reverse, unfueled, to unseal the cylinder; and diagnosing the laser ignition device based on a change in measured intake air temperature relative to the baseline intake temperature. In this way, a laser ignition system may be more robustly diagnosed while minimizing noise factors.

As an example, after an engine soak to ambient temperature following a key-off, an engine controller (e.g., an engine's powertrain control module or PCM) may wake up to diagnose the laser ignition system. The controller may spin the engine unfueled in a reverse direction (that is, opposite to the direction the engine is spun in during cranking) for a duration (e.g., for 15 seconds). By spinning the engine in reverse, an unfueled, un-combusted intake air stream is established with all cylinder laser igniters deactivated, and a corresponding baseline intake temperature for the (unfueled and un-combusted) intake stream may be noted. For example, the baseline intake air stream temperature may be measured by an intake air temperature sensor coupled to the intake passage. Once the baseline intake temperature is established, the controller may spin the engine slowly to park the engine in a position where a first cylinder, selected for laser ignition diagnostics, is sealed. Specifically, at the sealed position, both the intake and exhaust valves of the selected first cylinder may be fully closed, such as at a position of negative intake to exhaust valve overlap. The laser of the sealed cylinder is then activated, which causes heat to be generated in the cylinder (since there is no fuel to combust), and then trapped therein due to the valves being closed. After a duration of laser operation (e.g., a few minutes), the laser is deactivated and the engine is spun, unfueled, and in reverse to a position where at least the intake valve is open and the heated air from the cylinder is released into the intake passage. Optionally, if the laser is maneuverable, the laser beam from the igniter may be focused on an area near the intake valve to achieve more localized heat as that is the exit point for air out of the cylinder. Otherwise, the laser heats the top of the piston. A subsequent rise in the intake temperature (relative to the baseline value) following the engine reverse spinning indicates that the laser coupled to the first cylinder is functioning. Else, if the temperature does not rise, it may be determined that the laser coupled to the first cylinder is not functioning and a diagnostic code with a unique identifier for the first cylinder may be set. The controller may then proceed to re-establish a baseline intake temperature and similarly assess remaining cylinders, one at a time, by sealing the cylinder, operating the laser ignition device in the sealed cylinder, and spinning the engine, unfueled, in reverse. In still further examples, the engine may be subsequently spun forward and an exhaust temperature sensor may be used to diagnose the laser. In still a further example, the engine may be coupled in a vehicle configured with autonomous driving capabilities, and the diagnostic may be performed while the vehicle is in an autonomous mode.

In this way, the ability of laser ignitors to heat a metallic object upon impingement of the laser beam can be advantageously leveraged to diagnose the laser coupled to each cylinder. The technical effect of sealing a cylinder by reverse spinning the engine to a position where cylinder valves are closed, and operating the laser in the sealed cylinder, is that a temperature inside the cylinder can be raised. By then reverse spinning the engine to open the valves, the additional heat can be transferred to an intake stream. By comparing the change in intake air temperature following the opening of the cylinder valves relative to a previously established baseline temperature, the heat transfer from the laser ignition device can be measured, and the functionality of the laser can be inferred. By relying on the laser's motive energy and resultant heat generation during engine-off conditions, the laser can be diagnosed robustly and without confounding the results with noise factors from engine combustion. By performing the diagnostic sequentially on all engine cylinders, individual cylinder laser systems can be accurately diagnosed. By enabling a laser ignition system to be diagnosed, engine misfires due to ineffective laser operation in an engine system configured with laser ignition can be better distinguished from other misfire causes. Consequently, engine misfires may be mitigated in a timely and appropriate manner.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
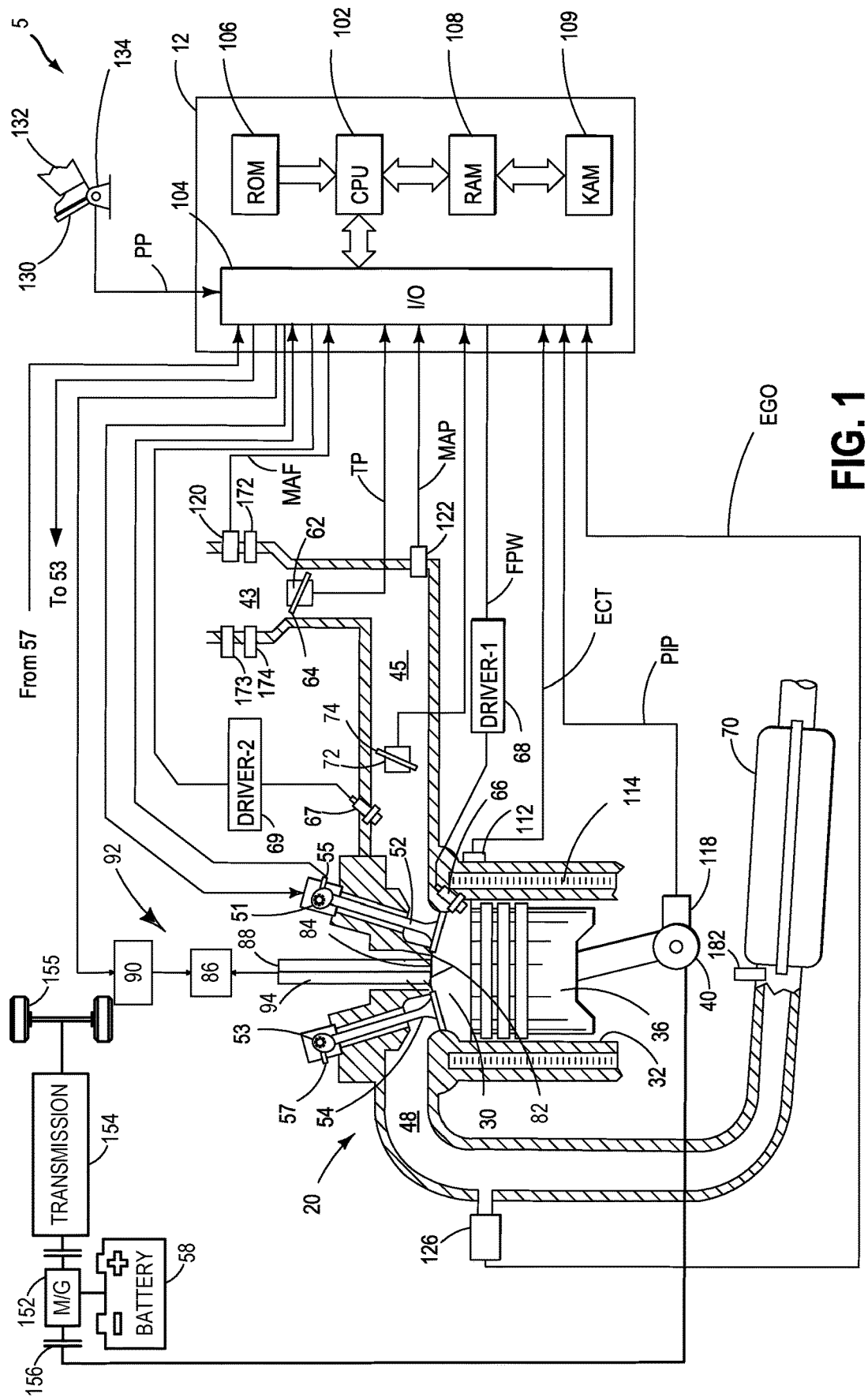
FIG. 1 shows an example combustion chamber of an internal combustion engine configured with a laser ignition system.

Methods and systems are provided for diagnosing the laser of a laser ignition system, such as the system of FIG. 1. An engine controller may be configured to perform a control routine, such as the example routines of FIG. 2, to determine whether to diagnose the laser based on intake air temperature measurements or exhaust temperature measurements. If conditions for intake temperature measurements are met, the controller may operate the laser ignition device in a sealed cylinder (FIG. 5) during a key-off condition, and then diagnose the laser ignition device coupled to the given cylinder based on a subsequent change in intake air temperature. If conditions for exhaust temperature measurements are met, the controller may operate the laser ignition device in the sealed cylinder (FIG. 5) during a key-off condition, and then diagnose the laser ignition device coupled to the given cylinder based on a subsequent change in exhaust temperature. An example laser diagnostic operation is shown with reference to FIG. 6.

Turning to FIG. 1, an example hybrid propulsion system 10 is depicted. The hybrid propulsion system may be configured in a passenger on-road vehicle, such as hybrid electric vehicle 5. Hybrid propulsion system 10 includes an internal combustion engine 20. Engine 20 may be a multi-cylinder internal combustion engine, one cylinder of which is depicted in detail at FIG. 1. Engine 20 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 20 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of propulsion system 10 via an intermediate transmission system. Combustion cylinder 30 may receive intake air from intake manifold 45 via intake passage 43 and may exhaust combustion gases via exhaust passage 48. Intake manifold 45 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In the example shown, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. To enable detection of cam position, cam actuation systems 51 and 53 may have toothed wheels. The position of intake valve 52 and exhaust valve 54 may be determined by cam position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. Fuel injector 67 is shown arranged in intake passage 43 in a configuration that provides what is known as port injection of fuel into the intake port upstream of combustion cylinder 30. Fuel injector 67 delivers fuel into the intake port in proportion to the pulse width of signal FPW-2 received from controller 12 via electronic driver 69. In this manner, fuel injector 67 provides what is known as port injection of fuel into combustion cylinder 30.

Intake passage 43 may include a charge motion control valve (CMCV) 74 and a CMCV plate 72 in addition to a throttle 62 having a throttle plate 64. In this particular example, the position of throttle plate 64 may be varied by controller 12 via a signal (TP) provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 43 may include a mass air flow sensor 120 and a manifold air pressure sensor 122 for providing respective signals MAF and MAP to controller 12.

Intake passage 43 may also include one or more temperature and/or pressure sensors for estimating ambient conditions. For example, intake passage 43 may include an intake air temperature (TAT) sensor 172 for estimating a temperature of intake air drawn into the intake manifold and thereon into engine cylinders. Intake passage 43 may further include a barometric pressure sensor 173 for estimating ambient pressure, and a humidity sensor 174 for estimating ambient humidity. During engine operation, one or more engine operating parameters may be adjusted based on the ambient temperature, pressure, and/or humidity, such as throttle position, engine dilution, valve timing, etc. As elaborated herein, during selected key-off conditions, intake air temperature sensor 172 may also be used for diagnosing a cylinder laser ignition system.

Exhaust gas sensor 126 is shown coupled to exhaust passage 48 upstream of an emission control device 70. Emission control device (ECD) 70 may include one or more catalytic converters and particulate matter filters. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOR, HC, or CO sensor. The exhaust system may include light-off catalysts and underbody catalysts, as well as exhaust manifold, upstream and/or downstream air/fuel ratio sensors. ECD 70 can include multiple catalyst bricks, in one example. In another example, multiple emission control devices, each with multiple bricks, can be used. ECD 70 can be a three-way type catalyst in one example.

In still further example, ECD 70 may include a particulate matter filter for retaining particulate matter (PM) emissions, such as soot and ash, from exhaust gas, before the gas is released to the atmosphere via a tailpipe. The filter may include one or more temperature and/or pressure sensors, such as temperature sensor 182, for estimating a PM load on the filter. The sensor may be coupled to the filter or multiple sensors may be coupled across the filter. For example, the PM load may be inferred based on a pressure or temperature differential across the filter. As elaborated herein, during selected key-off conditions, temperature sensor 182 may also be used for diagnosing a cylinder laser ignition system.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 109, and a data bus. The controller 12 may receive various signals and information from sensors coupled to engine 20, in addition to those signals previously discussed, including measurement of inducted mass air flow (MAF) from mass air flow sensor 120; engine coolant temperature (ECT) from temperature sensor 112 coupled to cooling sleeve 114; in some examples, a profile ignition pickup signal (PIP) from Hall effect sensor 118 (or other type) coupled to crankshaft 40 may be optionally included; throttle position (TP) from a throttle position sensor; and absolute manifold pressure signal, MAP, from sensor 122. The Hall effect sensor 118 may optionally be included in engine 20 because it functions in a capacity similar to the engine laser system described herein. Storage medium read-only memory 106 can be programmed with computer readable data representing instructions executable by processor 102 for performing the methods described below as well as variations thereof.

Engine 20 further includes a laser ignition system 92 for igniting an air-fuel mixture in cylinder 30. Laser ignition system 92 includes a laser exciter 88 and a laser control unit (LCU) 90. LCU 90 causes laser exciter 88 to generate laser energy. LCU 90 may receive operational instructions from controller 12. Laser exciter 88 includes a laser oscillating portion 86 and a light converging portion 84. The light converging portion 84 converges laser light generated by the laser oscillating portion 86 on a laser focal point 82 of combustion cylinder 30. In one example, light converging portion 84 may include one or more lenses.

A photodetector 94 may be located in the top of cylinder 30 as part of laser system 92 and may receive return pulses from the top surface of piston 36. Photodetector 94 may include a camera with a lens. In one example, the camera is a charge coupled device (CCD). The CCD camera may be configured to detect and read laser pulses emitted by LCU 90. In one example, when the LCU emits laser pulses in an infra-red frequency range, the CCD camera may operate and receive the pulses in the infra-red frequency range. In such an embodiment, the camera may also be referred to as an infrared camera. In other embodiments, the camera may be a full-spectrum CCD camera that is capable of operating in a visual spectrum as well as the infra-red spectrum. The camera may include a lens, such as a fish-eye lens, for focusing the detected laser pulses and generating an image of the interior of the cylinder. After laser emission from LCU 90, the laser sweeps within the interior region of cylinder 30. In one example, during cylinder laser ignition as well as during conditions when a cylinder piston position is to be determined, the laser may sweep the interior region of the cylinder at laser focal point 82. Light energy that is reflected off of piston 36 may be detected by the camera in photodetector 94.

It will be appreciated that while laser system 92 is shown mounted to a top of the cylinder, in alternate examples, the laser system may be configured with the laser exciter mounted on the side of the cylinder, substantially facing the valves.

Laser system 92 is configured to operate in more than one capacity with the timing and output of each operation based on engine position of a four-stroke combustion cycle. For example, laser energy may be utilized for igniting an air/fuel mixture during a power stroke of the engine, including during engine cranking, engine warm-up operation, and warmed-up engine operation. Fuel injected by fuel injector 66 may form an air/fuel mixture during at least a portion of an intake stroke, where igniting of the air/fuel mixture with laser energy generated by laser exciter 88 commences combustion of the otherwise non-combustible air/fuel mixture and drives piston 36 downward. Furthermore, light generated during the cylinder combustion event may be used by photodetector 94 for capturing images of an interior of the cylinder and assessing progress of the combustion event (e.g., for monitoring flame front progression).

In a second operating capacity, LCU 90 may deliver low powered pulses to the cylinder. The low powered pulses may be used to determine piston and valve position during the four-stroke combustion cycle. In addition, upon reactivating an engine from idle-stop conditions, laser energy may be utilized to monitor the position, velocity, etc. of the engine in order to synchronize fuel delivery and valve timing. Furthermore, light generated by the laser light pulse emission at the lower power may be used for capturing images of an interior of the cylinder before a cylinder combustion event occurs, such as during an intake stroke.

Controller 12 controls LCU 90 and has non-transitory computer readable storage medium including code to adjust the power output and location of laser energy delivery. Laser energy may be directed at different locations within cylinder 30. Controller 12 may also incorporate additional or alternative sensors for determining the operational mode of engine 20, including additional temperature sensors, pressure sensors, torque sensors as well as sensors that detect engine rotational speed, air amount and fuel injection quantity.

As described above, FIG. 1 shows one cylinder of multi-cylinder engine 20, and each cylinder may similarly include its own set of intake/exhaust valves, fuel injector, laser ignition system, etc.

The laser system 92 may be prone to degradation. For example, if exciter 88 does not function, a laser beam is not output into the cylinder even after receiving a command from LCU 90. As such, this can result in no cylinder torque being produced and a misfire event occurring. To better differentiate laser degradation induced misfires from other misfires, such as spark plug or air-fuel ratio induced misfires, the engine controller may intermittently and opportunistically diagnose the laser system. Specifically, the controller may leverage the ability of the laser exciter to heat a metallic object, such as the inside of the combustion chamber, when the laser beam strikes it. By relying on this motive energy to heat the charge in a sealed cylinder during selected key-off conditions, and measuring the effect on intake temperature when the heated charge is released from the sealed cylinder into an intake passage (via unfueled reverse rotation of the engine), the controller may identify laser degradation, as elaborated at FIG. 2.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 152. Electric machine 152 may be a motor or a motor/generator. Crankshaft 40 of engine 10 and electric machine 152 are connected via a transmission 154 to vehicle wheels 155 when one or more clutches 156 are engaged. In the depicted example, a first clutch 156 is provided between crankshaft 40 and electric machine 152, and a second clutch 156 is provided between electric machine 152 and transmission 154. Controller 12 may send a signal to an actuator of each clutch 156 to engage or disengage the clutch, so as to connect or disconnect crankshaft 140 from electric machine 152 and the components connected thereto, and/or connect or disconnect electric machine 152 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 152 receives electrical power from a traction battery 58 to provide torque to vehicle wheels 155. Electric machine 152 may also be operated as a generator to provide electrical power to charge battery 58, for example during a braking operation.

The controller 12 receives signals from the various sensors of FIG. 1 and employs the various actuators of FIG. 1 to adjust engine and vehicle operation based on the received signals and instructions stored on a memory of the controller. For example, responsive to a duration having elapsed since a key-off condition, the controller may wake up from sleep, spin the engine in reverse, unfueled, via a motor to establish a baseline intake temperature, and then heat the charge inside a sealed cylinder via operation of the laser ignition system. Then, the heated charge may be released from the sealed cylinder via an open intake valve into the intake passage and the controller may diagnose the laser ignition system based on the output of an intake air temperature sensor coupled to the intake passage, such as temperature sensor 172 coupled to intake passage 43. Additionally or optionally, the controller may wake up from sleep, spin the engine in a forward direction, unfueled via the motor to establish a baseline exhaust temperature, and heat the charge inside the sealed cylinder via operation of the laser ignition system. Then, the heated charge may be released from the sealed cylinder via an open exhaust valve and the controller may diagnose the laser ignition system based on the output of an exhaust passage temperature sensor, such as temperature sensor 172 coupled to the exhaust particulate matter filter.

In this way, the components of FIG. 1 enables an engine system comprising an engine including a cylinder; a laser ignition device coupled to the cylinder; an intake air temperature sensor coupled to an intake passage of the engine; an electric motor; and a controller. The controller may be configured with computer-readable instructions stored on non-transitory memory for waking up a powertrain control module from a sleep mode when a threshold duration has elapsed following an engine key-off; spinning the engine, unfueled via the motor, to establish a baseline intake air temperature; sealing the cylinder by spinning the engine, unfueled via the motor, to a position where all cylinder valves are closed; operating the laser ignition device in the sealed cylinder for a duration; unsealing the cylinder by re-spinning the engine, unfueled via the motor, to a position where at least an intake valve is open; and diagnosing the laser ignition device by comparing an intake air temperature measured after the operating with the baseline intake air temperature. As used herein, spinning and re-spinning the engine unfueled via the motor includes spinning the engine in reverse, in a direction opposite to the direction of fueled engine rotation, the engine spun in reverse at an engine speed lower than an engine cranking speed. Additionally, the system may comprise a humidity sensor for estimating an ambient humidity, wherein the comparing includes comparing a difference between the measured intake air temperature and the baseline intake air temperature to a threshold based on an estimated ambient humidity, and wherein the diagnosing includes indicating that the laser ignition device is degraded when the difference is higher than the threshold. In a further example, the controller includes further instructions for, responsive to the indication that the laser ignition device of the cylinder is degraded, during a subsequent engine restart from rest, disabling fueling and operation of the laser ignition device of the cylinder, and adjusting a misfire threshold of the cylinder.

Figure 2:
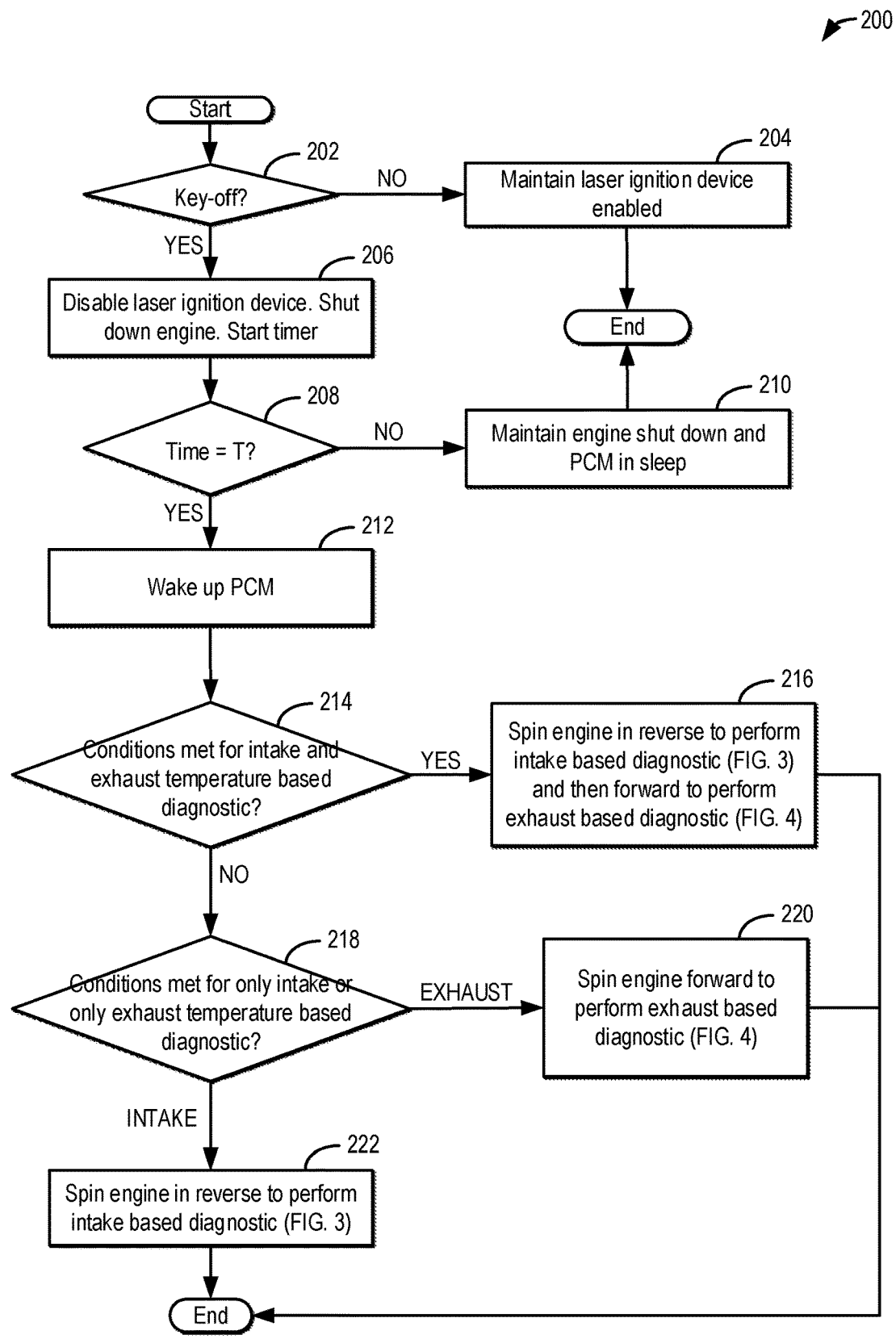
FIG. 2 shows a high level flow chart of a method for diagnosing the laser ignition system.

Turning now to FIG. 2, an example method 200 is shown for diagnosing a laser ignition system. Instructions for carrying out method 200 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes confirming if there is a key-off condition. In one example, a key-off condition may be confirmed responsive to a vehicle operator moving an ignition key to an off position, removing the ignition key, pressing an ignition off button, or removing a passive key from a vehicle cabin. Still other approaches may be used to confirm that engine ignition has been disabled. If a key-off is not confirmed, then at 204, the laser ignition device of the engine is maintained enabled and the engine continues to combust fuel.

At 206, upon confirming the key-off condition, the laser ignition device may be disabled. For example, the controller may send a signal to the LCU controlling the laser to disable power to the laser exciter. In addition, the engine may be shut down by disabling fuel to the engine and spinning the engine to rest. Further, the engine controller may put the processor (e.g., powertrain control module, PCM) to a sleep mode and start a timer. The sleep mode may be available in some PCMs whereby the PCM has an alarm clock that stays alive even after the engine is shut down to wake-up the controller without a key-on event at a designated alarm time. Prior to entering the sleep mode, the PCM is programmed to awaken at the designated alarm time (e.g., in a defined number of hours).

At 208, it may be determined if a threshold duration T has elapsed since the key-off on the timer. For example, it may be determined if a number of hours (e.g., 6 hours) have elapsed since the key-off. In one example, the threshold duration T may be based on a time required for the engine temperature to reduce to ambient conditions, such as a time required for engine coolant temperature to equilibrate with ambient air temperature. The threshold duration may be determined as a function of the ambient temperature, the duration reduced as the ambient temperature increases. If the threshold duration has not elapsed, at 210, the engine is maintained shut down and the PCM is maintained in the sleep mode.

At 212, responsive to the threshold duration having elapsed since the key-off, the processor is transitioned out of the sleep mode, thereby "waking up" the processor. At 214, it is determined if conditions have been met for diagnosing the laser ignition system via each of intake and exhaust based measurements. In one example, conditions for diagnosing via both measurements may be met if there are no constraints on either the intake measurement or the exhaust measurement, as elaborated below. Upon confirmation, the method moves to 216 and proceeds to spin the engine in reverse, unfueled, and diagnose the laser ignition system via an intake temperature based diagnostic, as elaborated at FIG. 3, and then spin the engine in a forward direction, unfueled, and diagnose the laser ignition system via an exhaust temperature based diagnostic, as elaborated at FIG. 4. When both diagnostics are possible, the order of performing the diagnostic may be determined based on condensate levels in the intake passage relative to the exhaust passage, time available to complete diagnostic, and/or battery state of charge. Alternatively, the order or may be a default order (such as intake based diagnostic followed by exhaust based diagnostic, or exhaust based diagnostic followed by intake based diagnostic). By diagnosing based on both approaches, the reliability and accuracy of the diagnostic result is improved.

If both diagnostics are not possible, then at 218, it is determined if only an intake air temperature based diagnostic or only an exhaust temperature based diagnostic is possible. In one example, only an intake based diagnostic may be possible if the exhaust filter was regenerated before the key-off and the filter temperature is still elevated enough to confound the exhaust based diagnostic. In another example, only an intake based diagnostic may be possible if the exhaust passage has condensation accumulation which can confound temperature results. Likewise, only an exhaust based diagnostic may be possible if the intake passage has condensation accumulation which can confound temperature results. In still another example, the selection may be based on a time constraint, such as an amount of time remaining before an anticipated key-on event. Alternatively, the selection may be based on a state of charge of a system battery powering the motor that is used to spin the engine, unfueled, and to power the laser. For example, the exhaust based diagnostic using forward engine spinning may be selected when there is less time remaining before a predicted key-on, or when a battery state of charge is lower as it takes less time to complete the diagnostic. In particular, since exhaust valves are larger than intake valves, they are able to dump larger volumes of heated cylinder air into the exhaust system, allowing for a faster diagnosis of the laser. As the diagnostic is performed during non-combustion mode, battery power may need to be conserved. Therefore by performing the exhaust temperature based diagnostic using the forward engine spinning during such conditions, the diagnostic may be completed faster and using less battery power than the intake temperature based diagnostic using the forward engine spinning. In some examples, the laser may be operated for a longer duration during the intake temperature based diagnostic and for a shorter duration during the exhaust temperature based diagnostic.

Figure 3:
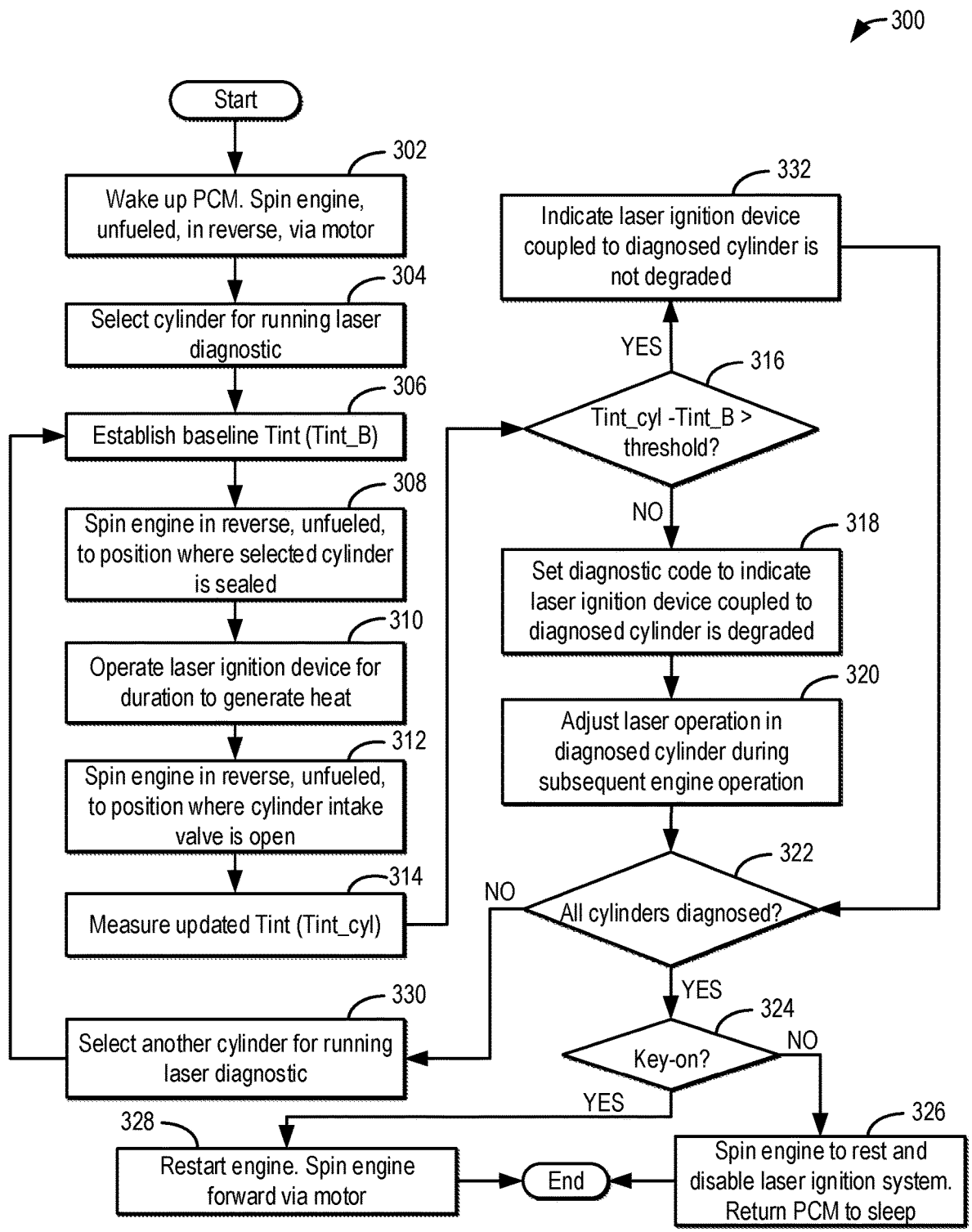
FIG. 3 shows a high level flow chart of a method for diagnosing the laser ignition system based on changes to an intake air temperature.

If only an intake based diagnostic is possible, then at 222, the method proceeds to spin the engine in reverse, unfueled, and diagnose the laser ignition system via an intake temperature based diagnostic, as elaborated at FIG. 3. Else, if only an exhaust based diagnostic is possible, then at 220, the method proceeds to spin the engine in a forward direction, unfueled, and diagnose the laser ignition system via an exhaust temperature based diagnostic, as elaborated at FIG. 4.

It will be appreciated that in some examples, the engine may be coupled in a vehicle having autonomous capabilities. Therein, the diagnostic(s) may be run while the vehicle is operated in an autonomous mode.

Turning now to FIG. 3, method 300 details an intake air temperature based laser diagnostic routine. The method of FIG. 3 may be performed as part of the method of FIG. 2, such as at 216 and/or at 222.

At 302, the method includes waking up the PCM controller from sleep after a threshold duration T has elapsed since an immediately prior key-off event. Also at 302, after waking up the PCM, the engine is spun unfueled, in reverse, via a motor, such as an electric starter motor, or an electric motor of the hybrid vehicle's driveline. Spinning the engine in reverse includes spinning the engine in a direction of rotation that is opposite to the direction of engine rotation during engine cranking (and thereby opposite to the direction of fueled engine rotation, as well as the direction of engine rotation during the exhaust temperature based diagnostic). The engine speed may be low enough to flow residual air that was trapped in the cylinders, as well as any air drawn in from the exhaust passage, through all the engine cylinders into the intake passage, thereby generating an intake stream. In particular, the generated air stream is an unfueled, un-combusted air stream that is used to establish a baseline intake temperature. The baseline temperature may be measured by a temperature sensor coupled to the intake passage, such as IAT sensor 172 of FIG. 1. In this way, existing hardware can be used for diagnosing the laser ignition system. In one example, the PCM wakes up and activates the motor to spin the engine unfueled in reverse at 500 RPM for 15 seconds.

At 304, the method includes selecting a cylinder for running the laser diagnostics. In one example, the cylinder that is next in the firing order (or the cylinder which will be the first to fire on the subsequent engine restart) may be selected as the first cylinder to be diagnosed. In another example, a cylinder may be selected based on the order of diagnosing the lasers on the last iteration of the diagnostic, the most recently diagnosed cylinder on the last iteration being diagnosed last on the current iteration. In still further examples, the cylinder may be selected according to a predefined order or based on the location of the cylinder on the engine block.

At 306, the method includes establishing a baseline intake temperature (Tint_B) for an unfueled and un-combusted intake stream with all cylinders laser ignitors deactivated. Specifically, the reverse engine spinning is stopped so that the baseline for the intake temperature can be established. For example, after spinning the engine unfueled in reverse for a duration, a temperature of the intake stream may be measured by an IAT sensor, if available, or an alternate intake passage temperature sensor.

At 308, the method includes spinning the engine unfueled and in reverse, again, to a position where the selected cylinder is sealed. Here the engine may be spun slower than when the engine was spun for establishing the baseline intake temperature. For example, the engine may be spun in reverse at a speed of 300 RPM until the cylinder is parked in a position where the intake and exhaust valves of the cylinder are closed. In one example, the engine is spun slowly in reverse until a position of complete negative intake to exhaust valve overlap is reached. In another example, the engine is spun slowly in reverse until an exhaust stroke TDC is reached.

Figure 5:
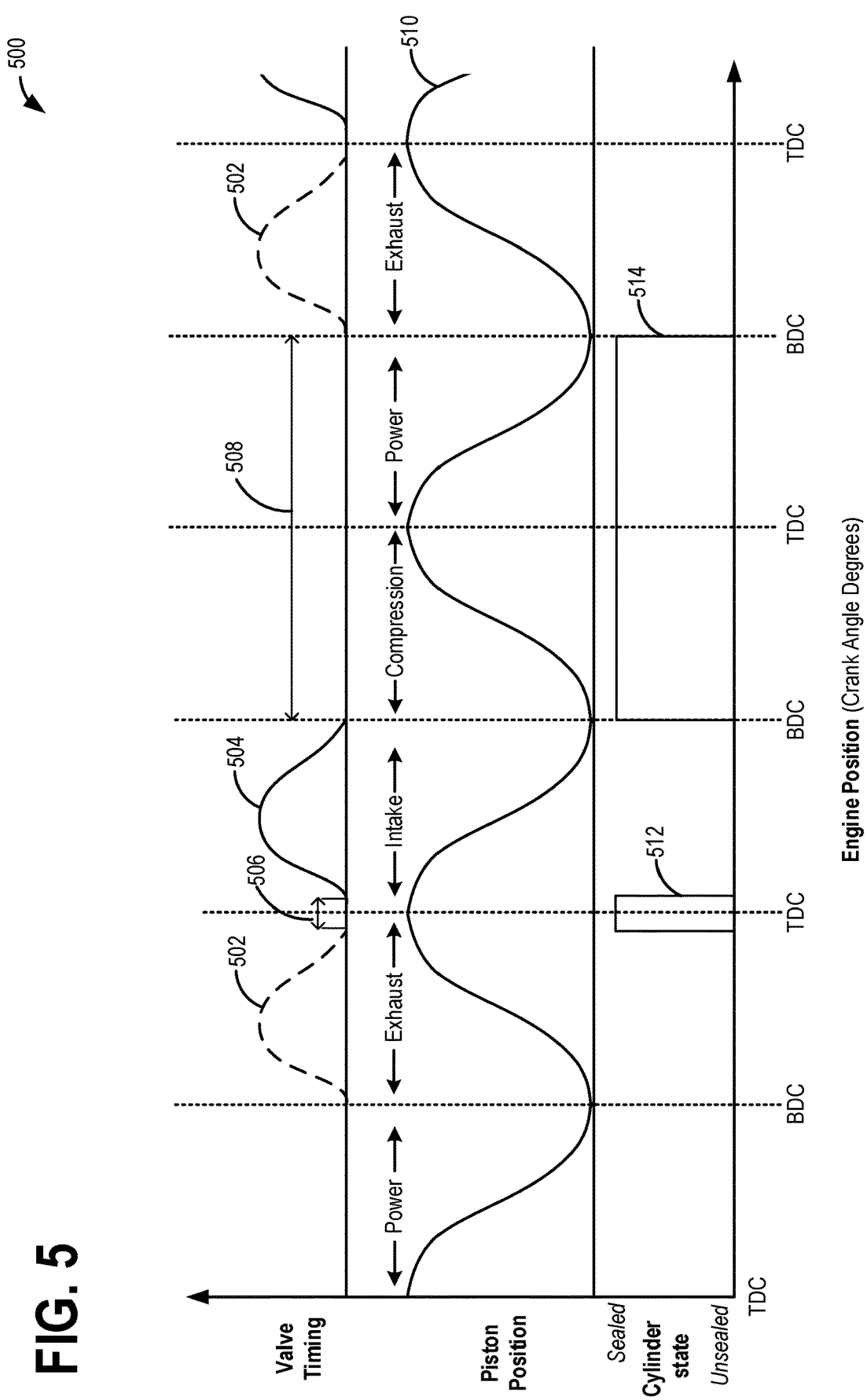
FIG. 5 shows an example map for selecting a cylinder position where cylinder valves are closed.

In one example, the controller may refer to a map, such as the example map 500 of FIG. 5, to select a position where the cylinder is sealed. Turning briefly to FIG. 5, map 500 depicts valve timing and piston position, with respect to an engine position, for a given engine cylinder. Map 500 illustrates an engine position along the x-axis in crank angle degrees (CAD). Curve 510 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 510, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 502 and 504 depict valve timings for an exhaust valve (dashed curve 502) and an intake valve (solid curve 504) during engine operation. As illustrated, an exhaust valve may be opened just as the piston bottoms out at the end of the power stroke. The exhaust valve may then close as the piston completes the exhaust stroke. In the same way, an intake valve may be opened at or before the start of an intake stroke, and may close just as the piston bottoms out at the end of the intake stroke. As a result of the timing differences between exhaust valve closing and intake valve opening, for a short duration depicted herein at 506, around exhaust stroke TDC, including before the end of the exhaust stroke and after the commencement of the intake stroke, both intake and exhaust valves of the given cylinder may be closed. This period, during which both valves may be closed, is referred to as a negative intake to exhaust valve overlap 506 (or simply, negative valve overlap). During this time, the cylinder is sealed to the atmosphere, as indicated at plot 512. During a laser diagnostic, the controller may spin the engine unfueled in reverse to a position where a cylinder that is being diagnosed is at a position within the region of negative valve overlap 506 so that the laser can be operated in the sealed cylinder. For example, the controller may spin the engine unfueled in reverse, to a position corresponding to exhaust stroke TDC of the selected cylinder, and then hold the engine in that position for a duration so that the laser of the given sealed cylinder can be operated to heat the air inside the sealed cylinder.

Alternatively, the controller may spin the engine unfueled to position the cylinder within region 508. Region 508 corresponds to another region where the cylinder is sealed. Region 508 is a duration between intake valve closing and exhaust valve opening where both intake and exhaust valves of the given cylinder may be closed. During this time, the cylinder is sealed to the atmosphere, as indicated at plot 514. Herein, the intake stroke and exhaust stroke being referred to are for the same combustion event/cycle while in the case of the negative valve overlap region 506, the intake stroke is for a combustion event/cycle immediately following the combustion event/cycle of the exhaust stroke.

In one example, the engine controller may seal the cylinder by spinning the engine, unfueled, to a position within negative valve overlap 506 during the laser diagnostic to take advantage of the smaller amount of air trapped inside the sealed cylinder. This may allow for improved heating of the trapped air during laser operation (when the laser is functional). In another example, the controller may not seal the cylinder by spinning to a position within region 508 due to the possibility of cylinder compression heating (due to the movement of the piston within the cylinder during the compression stroke) generating heat distinct from the laser operation, and potentially corrupting the results of the laser diagnostic. For example, the air trapped within the sealed cylinder may be heated due to the compression heating, even if the laser is operated while it is not functional. As a result, the laser device of the cylinder may be deemed to be not degraded when it actually is degraded (that is, a false negative result).

Returning to FIG. 3, at 310, the laser ignition device is operated for a duration in the sealed cylinder to generate heat. In particular, the laser ignition device is operated at the higher (or highest) power intensity, normally used for initiating cylinder combustion. In one example, the duration of operating the laser is 3 minutes. The engine controller may also adjust a location where the laser beam is focused. In one example, the laser beam is directed towards cylinder walls. In another example, the laser beam is directed towards the piston top. In yet another example, where the laser is maneuverable, the laser beam is focused on an area near the intake valve to achieve more localized heat. This location near the intake valve may be selected as this is the exit point for the heated air out of the cylinder. Since the deactivated cylinder is sealed by its parking state, with both intake and exhaust valves closed, the heat energy generated by the laser operation is trapped inside the sealed cylinder. Operating the laser for the duration may include the controller sending a duty cycle or pulse-width signal to the laser exciter to operate the laser at its highest power setting for the defined duration. After the duration of operation, the laser is disabled.

At 312, the method includes spinning the engine in reverse and unfueled, via the motor, again, to a position where the selected cylinder is unsealed. Here the engine may be spun slower than when the engine was spun for establishing the baseline intake temperature. For example, the engine may be spun at a speed of 300 RPM until at least the intake valve of the cylinder is opened. This enables the charge that was heated via the laser operation to be released into the intake passage. Alternatively, the engine may be reverse spun to a position where both the intake and exhaust valve of the given cylinder are open. In one example, the engine is spun until the cylinder is at intake stroke BDC.

At 314, the method includes re-measuring the intake air temperature (Tint_cyl) after releasing the heated charge from the cylinder. For example, the intake air temperature may be measured via the intake air temperature sensor. Next, at 226, the method includes determining if there is evidence of an increase in the intake temperature. For example, a difference between the intake temperature measured after operating the laser (Tint_cyl) and the baseline temperature (Tint_B) may be determined and the difference may be compared to a threshold. The threshold may be a non-zero positive threshold that is based on ambient conditions including ambient humidity. For example, as the ambient humidity increases, the threshold may be lowered. As ambient humidity increases, the amount of heat lost from laser operation to the ambient humid air increases, due to the higher heat absorbing ability of humid air. As another example, as the ambient temperature increases, the threshold may be lowered. In one example, the controller may refer to a look-up table stored in the controller's memory. The look-up table may use the ambient conditions as input and may output a threshold to be used for laser diagnostics. The threshold may alternatively be determined via a model or algorithm.

If the difference between the intake temperature after laser operation in a given cylinder and the baseline temperature is higher than the threshold, then at 316, the method includes indicating that the laser device coupled to the given cylinder that was diagnosed is not degraded. The method then moves to 322 to determine if all engine cylinders have been diagnosed. If not, then the method moves to 330 to select another cylinder for performing the laser diagnostics. The next cylinder may be selected based on the firing order, based on a predefined order, based on the location of the cylinder on the engine block, or based on the order or completing the laser diagnostics on the last iteration of the routine.

If the difference between the intake temperature after laser operation in the given cylinder and the baseline temperature is lower than the threshold, then at 318, it may be inferred that sufficient heat was not generated during the laser operation. Accordingly, responsive to the difference being lower than the threshold, the method includes indicating that the laser device coupled to the given cylinder that was diagnosed is degraded. The controller may then set a diagnostic code including a unique identifier to indicate that the laser device of the most recently diagnosed cylinder is degraded. Further, at 320, the method includes setting a flag to adjust operation of the degraded laser device coupled to the diagnosed cylinder when the engine is subsequently operated fueled. For example, when the engine is restarted, the controller may disable fuel in the diagnosed cylinder responsive to the laser ignition device of that cylinder being degraded. In still further examples, a misfire threshold of the given cylinder may be adjusted. The method then moves to 322 to determine if all cylinders have been diagnosed, and if not, the method moves to 330 to select another cylinder for performing the laser diagnostics, as discussed earlier.

From 330, the method returns to 306 to re-establish the baseline intake temperature. This includes the engine being spun in reverse, unfueled, via the motor to cool the engine. The engine may be spun for a duration that enables a sufficient amount of air to pass through the cylinders and ensure sufficient cooling. In one example, the engine is spun at 500 RPM for 15 seconds.

Returning to 322, if all the cylinders have been diagnosed, then at 324, a key-on condition may be queried. In one example, a key-on condition may be confirmed responsive to a vehicle operator moving an ignition key to an on position, inserting the ignition key, pressing an ignition on button, or placing a passive key into a vehicle cabin. Still other approaches may be used to confirm that engine ignition has been enabled. If a key-on is not confirmed, then at 326, the laser ignition device of the engine is disabled, the engine is spun down to rest (by disabling the motor), and the PCM is returned to sleep. Else, if a key-on condition is confirmed, then at 328, the engine is restarted. This includes cranking the engine via the starter motor up till an engine cranking speed and then resuming cylinder fueling. The engine rotation during the cranking via the motor is in a forward direction (e.g., in contrast to the reverse direction used during the laser diagnostics). The engine is then spun (also in the forward direction) by combusting fuel in the engine cylinders, the air-fuel mixture in each cylinder ignited via operation of the corresponding laser ignition device. In this way, the laser ignition device coupled to each cylinder of the engine can be reliably diagnosed taking advantage of the metal heating ability of the laser.

Figure 4:
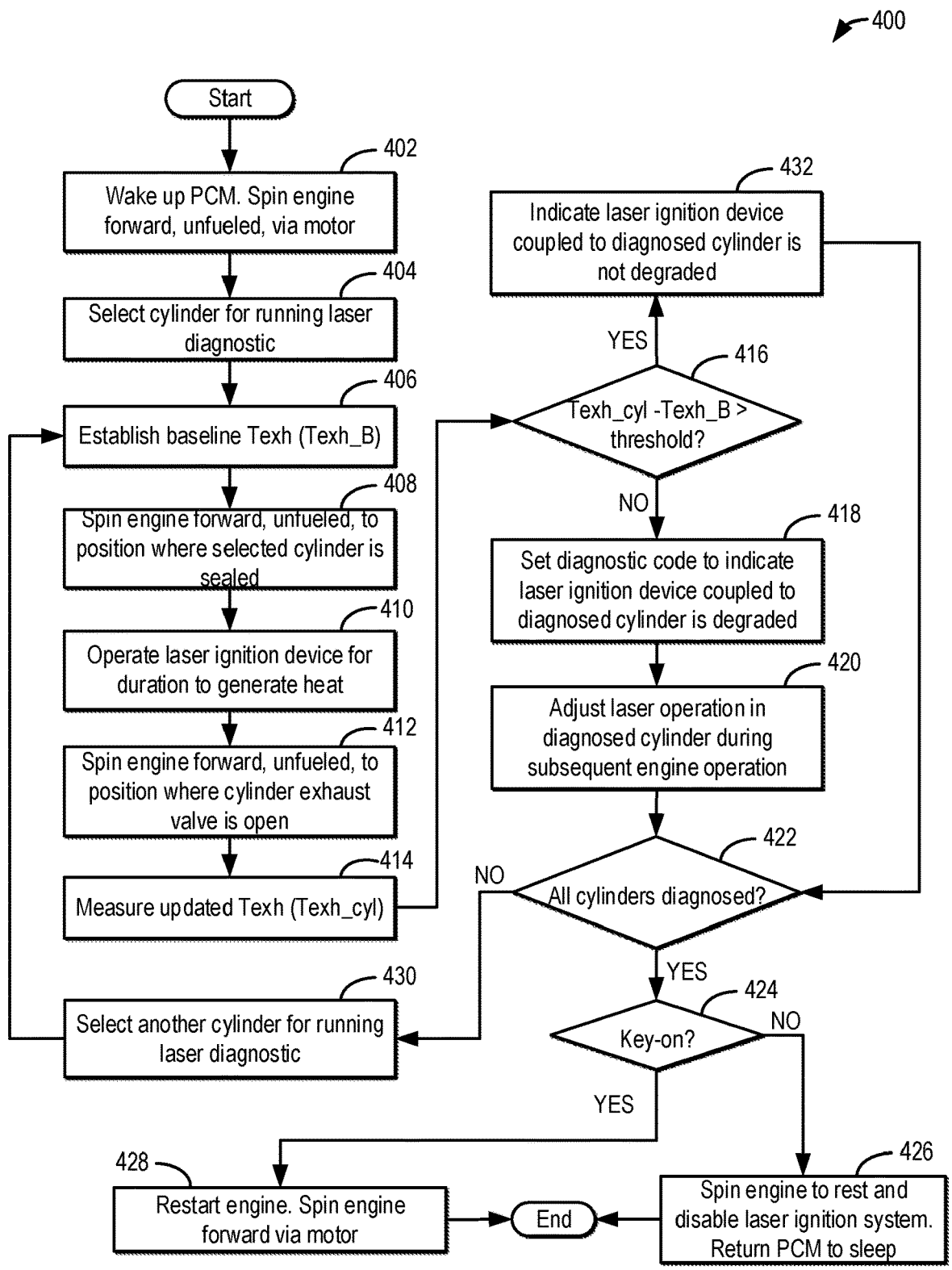
FIG. 4 shows a high level flow chart of a method for diagnosing the laser ignition system based on changes to an exhaust temperature.

Turning now to FIG. 4, method 400 details an exhaust temperature based laser diagnostic routine. The method of FIG. 4 may be performed as part of the method of FIG. 2, such as at 216 and/or at 220.

At 402, the method includes waking up the PCM controller from sleep after a threshold duration T has elapsed since an immediately prior key-off event. Also at 402, after waking up the PCM, the engine is spun in a forward direction, unfueled, via a motor, such as an electric starter motor, or an electric motor of the hybrid vehicle's driveline. Spinning the engine in a forward direction includes spinning the engine in the same direction of rotation as engine rotation during engine cranking and during fueled engine rotation (and opposite to the direction of engine rotation during the intake temperature based diagnostic). The engine speed may be low enough to flow air through all the engine cylinders into the exhaust passage, thereby generating an exhaust stream. In particular, the generated air stream is an unfueled, un-combusted air stream that is used to establish a baseline exhaust temperature. The baseline temperature may be measured by a temperature sensor coupled to the exhaust passage, such as temperature sensor 182 of FIG. 1. In this way, existing hardware can be used for diagnosing the laser ignition system. In one example, the PCM wakes up and activates the motor to spin the engine unfueled in the forward direction at 500 RPM for 15 seconds.

At 404, the method includes selecting a cylinder for running the laser diagnostics. In one example, the cylinder that is next in the firing order (or the cylinder which will be the first to fire on the subsequent engine restart) may be selected as the first cylinder to be diagnosed. In another example, a cylinder may be selected based on the order of diagnosing the lasers on the last iteration of the diagnostic, the most recently diagnosed cylinder on the last iteration being diagnosed last on the current iteration. In still further examples, the cylinder may be selected according to a predefined order or based on the location of the cylinder on the engine block.

At 406, the method includes establishing a baseline exhaust temperature (Texh_B) for an unfueled and un-combusted exhaust stream with all cylinders laser ignitors deactivated. Specifically, the engine spinning is stopped so that the baseline for the exhaust temperature can be established. For example, after spinning the engine unfueled in the forward direction, a temperature of the exhaust stream may be measured by a GFP filter temperature sensor, if available, or an alternate exhaust passage temperature sensor.

At 408, the method includes spinning the engine unfueled, again in the forward direction, to a position where the selected cylinder is sealed. Here the engine may be spun slower than when the engine was spun for establishing the baseline exhaust temperature. For example, the engine may be spun at a speed of 300 RPM until the cylinder is in a position where the intake and exhaust valves of the cylinder are closed. In one example, the engine is spun slowly until a position of complete negative intake to exhaust valve overlap is reached. In one example, the controller may refer to a map, such as the example map 500 of FIG. 5 described earlier, to select a position where the cylinder is sealed.

Next, at 410, the laser ignition device is operated for a duration in the sealed cylinder to generate heat. In particular, the laser ignition device is operated at the higher (or highest) power intensity, normally used for initiating cylinder combustion, the laser beam directed towards cylinder walls. In one example, the duration of operating the laser is 3 minutes). Since the deactivated cylinder is sealed by its parking state, with both intake and exhaust valves closed, the heat energy generated by the laser operation is trapped inside the sealed cylinder. In configurations where the laser is maneuverable, the laser energy may be focused on an area near the exhaust valve to achieve more localized heat as that is the exit point for air out of the cylinder. Else, the laser energy may be directed towards the top of the piston. Operating the laser for the duration may include the controller sending a duty cycle or pulse-width signal to the laser exciter to operate the laser at its highest power setting for the defined duration. After the duration of operation, the laser is disabled.

At 412, the method includes spinning the engine in the forward direction, unfueled, to a position where the selected cylinder is unsealed. Here the engine may be spun slower than when the engine was spun for establishing the baseline exhaust temperature. For example, the engine may be spun at a speed of 300 RPM until at least the exhaust valve of the cylinder is opened. This enables the charge that was heated via the laser operation to be released into the exhaust passage). At 414, the method includes re-measuring the exhaust temperature (Texh_cyl), such as via the exhaust temperature sensor. Next, at 416, the method includes determining if there is evidence of an increase in the exhaust temperature. For example, a difference between the exhaust temperature measured after operating the laser (Texh_cyl) and the baseline temperature (Texh_B) may be determined and the difference may be compared to a threshold. The threshold may be a non-zero positive threshold that is based on ambient conditions including ambient humidity. For example, as the ambient humidity increases, the threshold may be lowered. As ambient humidity increases, the amount of heat lost from laser operation to the ambient humid air increases, due to the higher heat absorbing ability of humid air. As another example, as the ambient temperature increases, the threshold may be lowered. In one example, the controller may refer to a look-up table stored in the controller's memory. The look-up table may use the ambient conditions as input and may output a threshold to be used for laser diagnostics. The threshold may alternatively be determined via a model or algorithm.

If the difference between the exhaust temperature after laser operation in a given cylinder and the baseline temperature is higher than the threshold, then at 432, the method includes indicating that the laser device coupled to the given cylinder that was diagnosed is not degraded. The method then moves to 422 to determine if all engine cylinders have been diagnosed. If not, then the method moves to 430 to select another cylinder for performing the laser diagnostics. The next cylinder may be selected based on the firing order, based on a predefined order, based on the location of the cylinder on the engine block, or based on the order or completing the laser diagnostics on the last iteration of the routine.

If the difference between the exhaust temperature after laser operation in the given cylinder and the baseline temperature is lower than the threshold, then at 418, it may be inferred that sufficient heat was not generated during the laser operation. Accordingly, responsive to the difference being lower than the threshold, the method includes indicating that the laser device coupled to the given cylinder that was diagnosed is degraded. The controller may then set a diagnostic code including a unique identifier to indicate that the laser device of the most recently diagnosed cylinder is degraded. Further, at 420, the method includes setting a flag to adjust operation of the degraded laser device coupled to the diagnosed cylinder when the engine is subsequently operated fueled. For example, when the engine is restarted, the controller may disable fuel in the diagnosed cylinder responsive to the laser ignition device of that cylinder being degraded. In still further examples, a misfire threshold of the given cylinder may be adjusted. The method then moves to 422 to determine if all cylinders have been diagnosed and if not, the method moves to 430 to select another cylinder for performing the laser diagnostics, as discussed earlier.

From 430, the method returns to 406 to re-establish the baseline exhaust temperature. This includes the engine being spun unfueled via the motor to cool the engine. The engine may be spun for a duration that enables a sufficient amount of air to pass through the cylinders and ensure sufficient cooling. In one example, the engine is spun at 500 RPM for 15 seconds.

Returning to 422, if all the cylinders have been diagnosed, then at 424, a key-on condition may be confirmed. In one example, a key-on condition may be confirmed responsive to a vehicle operator moving an ignition key to an on position, inserting the ignition key, pressing an ignition on button, or placing a passive key into a vehicle cabin. Still other approaches may be used to confirm that engine ignition has been enabled. If a key-on is not confirmed, then at 426, the laser ignition device of the engine is disabled, the engine is spun down to rest (by disabling the motor), and the PCM is returned to sleep. Else, if a key-on condition is confirmed, then at 428, the engine is restarted. This includes cranking the engine in the forward direction via the starter motor up till an engine cranking speed and then resuming cylinder fueling. The engine is then spun in the forward direction by combusting fuel in the engine cylinders, the air-fuel mixture in each cylinder ignited via operation of the corresponding laser ignition device. In this way, the laser ignition device coupled to each cylinder of the engine can be reliably diagnosed taking advantage of the metal heating ability of the laser.

In embodiments where both the intake and the exhaust diagnostic can be performed, the controller may complete the intake-based diagnostic on the laser ignition system of all engine cylinders and then complete the exhaust-based diagnostic on the laser ignition system of all engine cylinders. Alternatively, for each cylinder, the intake and exhaust based diagnostic may be performed sequentially before moving to diagnose the next cylinder. The controller may compare the output of both diagnostics to more reliably determine if the laser ignition system is degraded. In this way, an engine controller may operate a laser ignition device in a sealed, unfueled engine cylinder after an engine key-off. Then, during a first condition, the controller may comparing a measured exhaust temperature (such as measured via an exhaust temperature sensor coupled upstream of an exhaust filter) after the operating to a baseline exhaust temperature established via unfueled engine spinning. In comparison, during a second condition, the controller may compare a measured intake temperature (such as measured via an intake air temperature sensor coupled to an air intake passage) after the operating to a baseline intake temperature established via the unfueled engine spinning. In some examples, the method may include determining whether to perform one or more of each of comparing the exhaust temperature to the baseline level and comparing the intake temperature to the baseline level based on a determination of whether the first condition is present and a determining of whether the second condition is present. In one example, the method may include determining the first condition based on the presence of condensation in the intake passage, and in response thereto performing the exhaust temperature based laser diagnostic. The method may further include determining the second condition based on the presence of condensation in the exhaust passage, and in response thereto performing the intake temperature based laser diagnostic. Alternatively, the second condition may be determined responsive to a higher than threshold exhaust filter temperature (such as due to regeneration of the exhaust filter during a last key-on condition). In some examples, the intake temperature based diagnostic occurs only when the second condition is confirmed and the first condition is not confirmed while the exhaust temperature based diagnostic occurs only when the second condition is not confirmed and the first condition is confirmed. The controller may differentiate between the first condition and the second condition based on condensate levels in the intake passage relative to the exhaust passage, and may then select the different diagnostics in response to the differentiation. In still further examples, both of the first and second condition may be confirmed and both the intake and exhaust temperature based diagnostic is performed, for example, sequentially. Therein, both of the intake diagnostic and the exhaust diagnostic may happen in a single drive cycle.

During both the first and second conditions, the controller may then diagnose the laser ignition device based on the comparing. For example, during the first condition, the baseline exhaust temperature may be established by spinning the engine unfueled via a motor in a first direction, and the measured exhaust temperature may be measured via an exhaust temperature sensor. In comparison, during the second condition, the baseline intake temperature may be established by spinning the engine unfueled via the motor in a second, direction, opposite the first direction, and the measured intake temperature may be measured via an intake air temperature sensor. Before operating the laser ignition device, the controller may seal the engine cylinder by spinning the engine, unfueled, via the motor to a position where each of an intake valve and an exhaust valve of the cylinder is closed. Then, after operating the laser ignition device, during the first condition, the controller may spin the engine, unfueled via the motor to a position where the exhaust valve of the cylinder is open, while during the second condition, the controller may spin the engine, unfueled via the motor to a position where the intake valve of the cylinder is open. Further, the comparing may include calculating a difference between the measured exhaust temperature and the baseline exhaust temperature during the first condition, calculating a difference between the measured intake temperature and the baseline intake temperature during the second condition, and comparing the difference to a threshold, the threshold adjusted as a function of ambient humidity. The controller may then indicate that the laser ignition device of the engine cylinder is not degraded when the difference is higher than the threshold, and indicate that the laser ignition device of the engine cylinder is degraded when the difference is lower than the threshold. In some examples, the controller may maintain a misfire threshold of the cylinder when the laser ignition device is indicated to not be degraded, and adjust the misfire threshold of the cylinder when the laser ignition device is indicated to be degraded. In still further examples, the laser ignition device may be operated for a first, shorter duration before measuring the exhaust temperature during the first condition, while the laser ignition device is operated for a second duration, longer than the first duration, before measuring the intake temperature during the second condition. In still other examples, the laser is operated for the same duration prior to both the exhaust and the intake temperature measurements.

Figure 6:
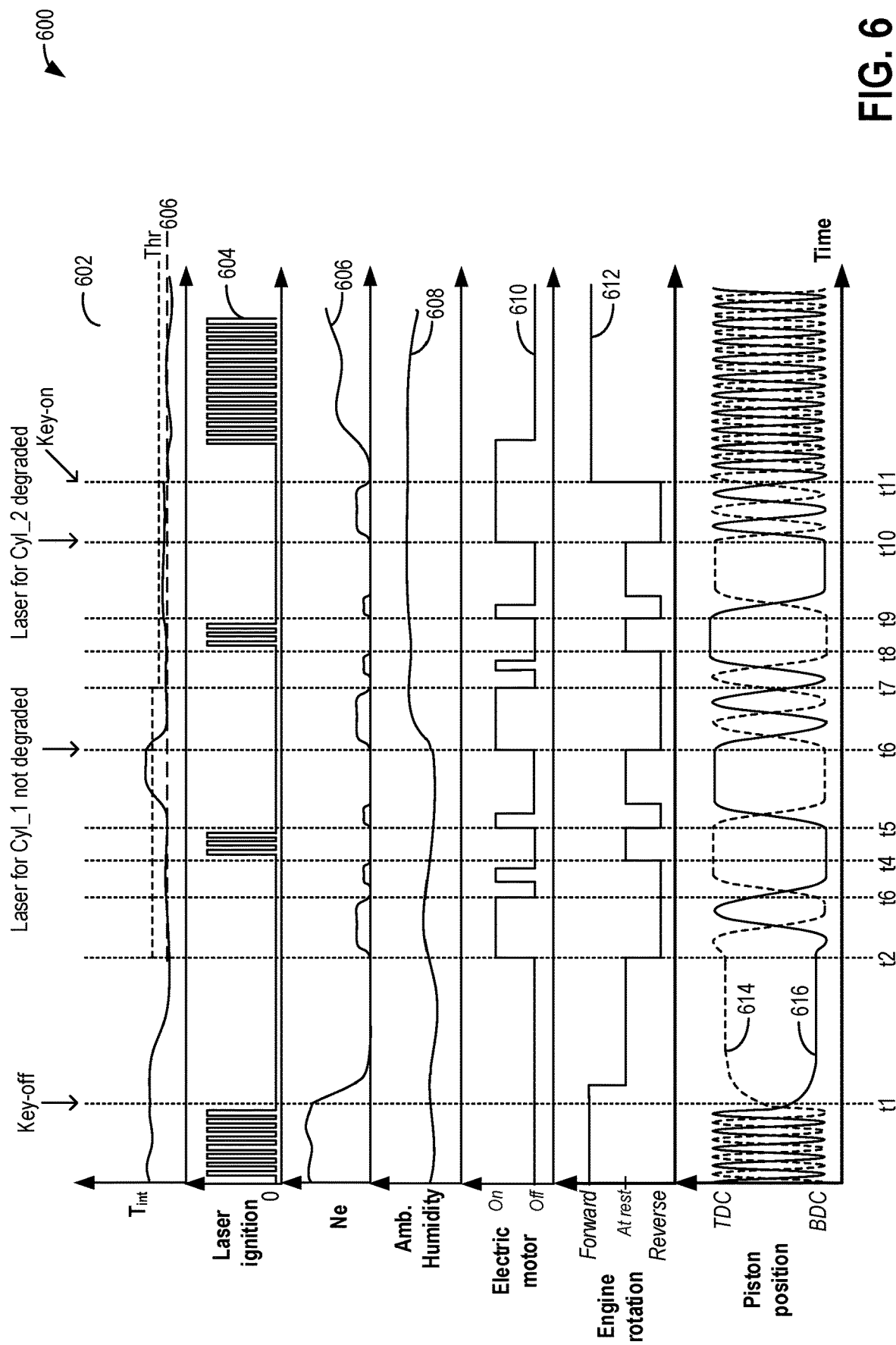
FIG. 6 shows an example diagnosis of the laser ignition system of an engine.

Turning now to FIG. 6, an example operation of a laser ignition system (such as the laser system of FIG. 1) for diagnosing the laser based on intake air temperature changes, is shown at map 600. It will be appreciated that the laser ignition system may be similarly diagnosed based on exhaust temperature changes. Map 600 depicts measured intake air temperature at plot 602 (such as measured by an intake air temperature sensor coupled to the air intake passage), laser ignition device operation at plot 604, engine speed (Ne) at plot 606, and ambient humidity at plot 608. An activation state of an electric motor is shown in plot 610 and a direction of engine rotation (forward, reverse, or at rest with no rotation) is shown at plot 612. Map 600 further depicts a piston position of a first cylinder at plot 614 (dashed line) in comparison to a piston position of a second cylinder at plot 616 (solid line). All plots are shown over time, along the x-axis.

Prior to t1, the engine of a vehicle is operating fueled. The engine rotates in a forward direction (plot 612) at an engine speed (plot 606) based on the operator torque demand. Fuel in each cylinder is ignited by operating the corresponding laser ignition device (plot 604) on each combustion event at an output that enables cylinder combustion. The intake air temperature is at ambient level (plot 602). At this time, the ambient humidity is lower (plot 608), such as due to the vehicle travelling through a dry, arid region. Due to the vehicle being propelled using engine torque, an electric motor is maintained deactivated (or off).

As the engine is rotated in a forward direction, a piston within each cylinder of the engine travels between BDC and TDC. For example, for each 360 degree rotation of the crankshaft, the piston may travel from BDC to TDC and back to TDC. The piston of the first cylinder (plot 614) may be 180 degrees out of phase of the second cylinder (plot 616) such that the pistons of the first set of cylinders are at TDC when the pistons of the first set of cylinders are at BDC (and vice versa). For example, the engine may be an inline-four cylinder engine.

At t1, the vehicle operator removes the key from the ignition and a key-off condition is confirmed. Responsive to the key-off condition, the engine is shut down including engine fueling and ignition being disabled.

At t2, a sufficient duration has elapsed since the key-off and the intake temperature has equilibrated with the ambient temperature. At this time, the controller determines that intake air temperature based laser ignition system diagnostics can be run. Therefore at t2, the electric motor is activated and the engine is spun in reverse, unfueled via the motor for a duration from t2 and t3. A baseline intake temperature 603 is established via the unfueled reverse engine spinning. As a result of the slower spinning, the cylinders move between TDC and BDC at a slower rate than before t1. By spinning all the engine cylinders in reverse for a duration, the controller establishes an intake air stream heading from the cylinders towards the intake passage.

Next at t3, the engine is spun unfueled in the reverse direction again for a duration from t3 to t4 (shorter than the duration from t2 to t3). The short, slow spin at t3 to t4 moves the first cylinder to be diagnosed to a position where the cylinder is sealed and both the intake and exhaust valve of the cylinder are closed. The remaining cylinders are not sealed at this time. Specifically, the engine is slowly rotated in reverse via the motor until the piston of the first cylinder is positioned at TDC (plot 614). The first cylinder may be at TDC at the end of its exhaust stroke where there is more than nominal negative valve overlap due to both the cylinder's intake valves and exhaust valves being closed. At the same time, the second cylinder may be at the end of its compression stroke at BDC. As such, the first cylinder is positioned with its intake and exhaust valves closed and its cylinder volume minimized while the intake and exhaust valves of the second cylinder remain at least partially open.

Between t4 and t5, while holding the first cylinder in the sealed state, the laser ignition device of the first cylinder is operated without delivering fuel to the cylinder. As a result of the laser operation, the air in the sealed cylinder is heated. At t5, the engine is spun in reverse, unfueled via the motor again, for a short duration (herein at the same speed and the same duration as between t3 and t4) to move the first cylinder from the fully sealed position to a position where at least the intake valve is open (such as from exhaust stroke TDC to intake stroke BDC). Then, the engine spinning is stopped and a change in intake air temperature is monitored. In the depicted example, following laser operation in first cylinder, a rise in intake air temperature is observed. Specifically, the intake air temperature rises above threshold Thr which is based on the ambient humidity. Due to the intake air temperature rising above the threshold, at t6, it is determined that the laser coupled to the first cylinder is not degraded.

Between t6 and t7, the engine is spun in reverse unfueled again for a duration to cool the engine and reestablish the baseline temperature. In the depicted example, the engine is spun at the same speed as was used between t2 and t3, and the same baseline temperature 303 is established. However, in other examples, the baseline may be reestablished following engine spinning for the duration. Also between t6 and t7, the ambient humidity increases, such as due to rain or other form of precipitation (e.g., snow, sleet, etc.). As a result of the increase in ambient humidity, the threshold Thr is lowered (relative to its earlier value) due to the higher heat absorbing ability of the humid air.

After the baseline exhaust temperature 603 is established via the unfueled engine spinning, at t7, the engine is spun in the reverse direction unfueled for a duration t7 to t8 (shorter than the duration t6 to t7), at a speed lower than the spinning to establish the baseline temperature. The short, slow spin at t7 to t8 moves the second cylinder to be diagnosed to a position where the cylinder is sealed, and both the intake and exhaust valve of the cylinder are closed. Specifically, the engine is slowly rotated in reverse via the motor until the piston of the second cylinder is positioned at TDC (plot 616). The second cylinder may be at TDC at the end of its exhaust stroke where there is more than nominal negative valve overlap due to both the cylinder's intake valves and exhaust valves being closed. At the same time, the first cylinder may be at the end of its compression stroke at BDC. As such, the second cylinder is positioned with its intake and exhaust valves closed and its cylinder volume minimized while the intake and exhaust valves of the first cylinder remain at least partially open.

Between t8 and t9, while holding the cylinder in the sealed state, the laser ignition device of the cylinder is operated without delivering fuel to the cylinder. As a result of the laser operation, the air in the sealed cylinder is heated. At t9, the engine is spun in reverse unfueled again for a short duration (herein at the same speed and the same duration as between t7 and t8) to move the cylinder from the sealed position to a position where at least the intake valve is open (such as from exhaust stroke TDC to intake stroke BDC). Then, the engine spinning is stopped and a change in intake air temperature is monitored. In the depicted example, following laser operation in the second cylinder, an insufficient rise in intake air temperature is observed. Specifically, the intake air temperature does not rise above humidity adjusted threshold Thr. Due to the intake air temperature not rising above the threshold, at t10, it is determined that the laser coupled to the second cylinder is degraded and a diagnostic code including an identifier for the second cylinder is set.

Between t10 and t11, the engine is spun unfueled for a duration to reestablish the baseline temperature so that a next cylinder can be diagnosed. However at t11, before the next cylinder can be diagnosed, a key-on condition is confirmed responsive to the operator inserting a key into the ignition. Therefore at t11, the engine is restarted. This includes the engine being cranked by the motor, with engine rotation in the forward direction, until a cranking speed is reached, and then engine fueling being resumed. In addition, cylinder ignition via the laser ignition device is resumed. Thereafter, the engine rotates in the forward direction using engine generated combustion torque. As a result of combustion of fuel in the engine, the engine speed starts to increase.

In this way, an engine controller may spinning an engine in reverse, unfueled, to establish a baseline intake air temperature and then seal a cylinder at a position of negative valve overlap; operate a laser ignition device in the sealed cylinder; spin the engine in reverse, unfueled, to unseal the cylinder; and diagnose the laser ignition device based on a change in measured intake air temperature relative to the baseline intake temperature. Responsive to the measured intake air temperature exceeding the baseline intake air temperature by a threshold, the controller may indicate that the laser ignition device is not degraded; and responsive to the measured intake air temperature not exceeding the baseline intake air temperature by the threshold, the controller may indicate that the laser ignition device is degraded. The controller may additionally select the threshold as a function of ambient conditions including ambient humidity. For example, the threshold may be decreased from a nominal value as the ambient humidity increases. Additionally, responsive to the indicating that the laser ignition device is degraded, the controller may adjust a misfire threshold of the cylinder. In one example, where the cylinder is a first cylinder of the engine, indicating that the laser ignition device is degraded includes setting a diagnostic code with a unique identifier for the first cylinder. Then, after the indicating, the controller may re-spin the engine in reverse, unfueled, to reestablish the baseline intake air temperature and then diagnose a second cylinder. Spinning the engine in reverse, unfueled, includes spinning the engine via an electric motor in a direction opposite to the direction of engine rotation during cranking and during fueled engine rotation, the electric motor including a starter motor and a hybrid vehicle driveline motor. Spinning the engine in reverse, unfueled, further includes initially spinning the engine in reverse at a first speed for a first duration to establish the baseline intake temperature; then spinning the engine in reverse at a second speed, lower than the first speed, and for a second duration, smaller than the second duration to seal the cylinder by moving to the position of negative valve overlap; and then spinning the engine in reverse at the second speed for a third duration, smaller than the second duration, to unseal the cylinder by moving to another position where at least an intake valve is open. Spinning the engine in reverse, unfueled, may further include waking up an engine controller and spinning the engine in reverse after a threshold duration has elapsed since an engine key-off event. In one example, the intake air temperature is measured via an intake air temperature sensor coupled to an air intake passage of the engine.

In this way, a laser ignition device of each cylinder of an engine is reliably diagnosed. By operating a laser ignition device in a sealed engine cylinder, the ability of the laser to generate heat can be used to diagnose the laser. By unsealing the cylinder after the heating, and monitoring a change in intake air temperature relative to a pre-established baseline temperature, the absence or presence of a rise in intake air temperature can be correlated with laser function. By monitoring the intake air temperature following laser operation during a key-off condition, corruption of results due to noise factors from engine combustion can be reduced. By correlating the changes to an intake air temperature following laser operation during a key-off condition with changes to an exhaust temperature following laser operation during the key-off condition, reliability of diagnostic results is improved. By diagnosing laser degradation in a timely manner, laser degradation induced misfires can be better distinguished from spark plug or air-fuel ratio induced misfires, and accordingly mitigated.

One example method comprises spinning an engine in reverse, unfueled, to establish a baseline intake air temperature and then sealing a cylinder at a position of negative valve overlap; operating a laser ignition device in the sealed cylinder; spinning the engine in reverse, unfueled, to unseal the cylinder; and diagnosing the laser ignition device based on a change in measured intake air temperature relative to the baseline intake temperature. In the preceding example, additionally or optionally, the diagnosing includes: responsive to the measured intake air temperature exceeding the baseline intake air temperature by a threshold, indicating that the laser ignition device is not degraded; and responsive to the measured intake air temperature not exceeding the baseline intake air temperature by the threshold, indicating that the laser ignition device is degraded. In any or all of the preceding examples, additionally or optionally, the method further comprises selecting the threshold as a function of ambient conditions including ambient humidity. In any or all of the preceding examples, additionally or optionally, the threshold is decreased from a nominal value as the ambient humidity increases. In any or all of the preceding examples, additionally or optionally, the method further comprises, responsive to the indicating that the laser ignition device is degraded, adjusting a misfire threshold of the cylinder. In any or all of the preceding examples, additionally or optionally, the cylinder is a first cylinder of the engine and wherein indicating that the laser ignition device is degraded includes setting a diagnostic code with a unique identifier for the first cylinder. In any or all of the preceding examples, additionally or optionally, the method further comprises, after the indicating, re-spinning the engine in reverse, unfueled, to reestablish the baseline intake air temperature and then diagnosing a second cylinder. In any or all of the preceding examples, additionally or optionally, spinning the engine in reverse, unfueled, includes spinning the engine via an electric motor in a direction opposite to the direction of engine rotation during cranking and during fueled engine rotation, the electric motor including a starter motor and a hybrid vehicle driveline motor. In any or all of the preceding examples, additionally or optionally, spinning the engine in reverse, unfueled, includes initially spinning the engine in reverse at a first speed for a first duration to establish the baseline intake temperature; then spinning the engine in reverse at a second speed, lower than the first speed, and for a second duration, smaller than the second duration to seal the cylinder by moving to the position of negative valve overlap; and then spinning the engine in reverse at the second speed for a third duration, smaller than the second duration, to unseal the cylinder by moving to another position where at least an intake valve is open. In any or all of the preceding examples, additionally or optionally, the intake temperature is measured via an intake air temperature sensor coupled to an air intake passage of the engine. In any or all of the preceding examples, additionally or optionally, spinning the engine in reverse, unfueled, includes waking up an engine controller and spinning the engine in reverse after a threshold duration has elapsed since an engine key-off event.

Another example method comprises operating a laser ignition device in a sealed, unfueled engine cylinder after an engine key-off; during a first condition, comparing a measured exhaust temperature after the operating to a baseline exhaust temperature established via unfueled engine spinning; during a second condition, comparing a measured intake temperature after the operating to a baseline intake temperature established via the unfueled engine spinning and during both the first and second condition, diagnosing the laser ignition device based on the comparing. In the preceding example, additionally or optionally, during the first condition (and not during the second condition), the baseline exhaust temperature is established by spinning the engine unfueled via a motor in a first direction, and the measured exhaust temperature is measured via an exhaust temperature sensor, and wherein during the second condition (and not during the first condition), the baseline intake temperature is established by spinning the engine unfueled via the motor in a second, direction, opposite the first direction, and the measured intake temperature is measured via an intake air temperature sensor. In any or all of the preceding examples, additionally or optionally, the comparing includes calculating a difference between the measured exhaust temperature and the baseline exhaust temperature during the first condition, calculating a difference between the measured intake temperature and the baseline intake temperature during the second condition, and comparing the difference to a threshold, the threshold adjusted as a function of ambient humidity. In any or all of the preceding examples, additionally or optionally, the diagnosing includes indicating that the laser ignition device of the engine cylinder is not degraded when the difference is higher than the threshold, and indicating that the laser ignition device of the engine cylinder is degraded when the difference is lower than the threshold, the method further comprising maintaining a misfire threshold of the cylinder when the laser ignition device is indicated to not be degraded; and adjusting the misfire threshold of the cylinder when the laser ignition device is indicated to be degraded. In any or all of the preceding examples, additionally or optionally, the method further comprises, before operating the laser ignition device, sealing the engine cylinder by spinning the engine, unfueled, via the motor to a position where each of an intake valve and an exhaust valve of the cylinder is closed, and after operating the laser ignition device, during the first condition, spinning the engine, unfueled via the motor to a position where the exhaust valve of the cylinder is open, and during the second condition, spinning the engine, unfueled via the motor to a position where the intake valve of the cylinder is open.

An example engine system comprises an engine including a cylinder; a laser ignition device coupled to the cylinder; an intake air temperature sensor coupled to an intake passage of the engine; an electric motor; and a controller with computer-readable instructions stored on non-transitory memory for waking up a powertrain control module from a sleep mode when a threshold duration has elapsed following an engine key-off; spinning the engine, unfueled via the motor, to establish a baseline intake air temperature; sealing the cylinder by spinning the engine, unfueled via the motor, to a position where all cylinder valves are closed; operating the laser ignition device in the sealed cylinder for a duration; unsealing the cylinder by re-spinning the engine, unfueled via the motor, to a position where at least an intake valve is open; and diagnosing the laser ignition device by comparing an intake air temperature measured after the operating with the baseline intake air temperature. In the preceding example, additionally or optionally, spinning and re-spinning the engine unfueled via the motor includes spinning the engine in reverse, in a direction opposite to the direction of fueled engine rotation, the engine spun in reverse at an engine speed lower than an engine cranking speed. In any or all of the preceding examples, additionally or optionally, the system further comprises a humidity sensor for estimating an ambient humidity, wherein the comparing includes comparing a difference between the measured intake air temperature and the baseline intake air temperature to a threshold based on an estimated ambient humidity, and wherein the diagnosing includes indicating that the laser ignition device is degraded when the difference is higher than the threshold. In any or all of the preceding examples, additionally or optionally, the controller includes further instructions for, responsive to the indicating that the laser ignition device of the cylinder is degraded, during a subsequent engine restart from rest, disabling fueling and operation of the laser ignition device of the cylinder, and adjusting a misfire threshold of the cylinder. In another representation, the engine system is included in a hybrid electric vehicle system, wherein the electric motor is a driveline motor for propelling vehicle wheels.

In yet another representation, a method for an engine comprises: operating a laser ignition device in a sealed, unfueled engine cylinder after an engine key-off; comparing a measured intake air temperature after the operating to a baseline intake air temperature established via unfueled reverse engine spinning; and diagnosing the laser ignition device based on the comparing. In any or all of the preceding examples, additionally or optionally, the comparing includes calculating a difference between the measured intake air temperature and the baseline intake air temperature, and comparing the difference to a threshold, the threshold adjusted as a function of ambient humidity. In any or all of the preceding examples, additionally or optionally, the diagnosing includes when the difference is higher than the threshold, indicating that the laser ignition device of the engine cylinder is not degraded; and when the difference is lower than the threshold, indicating that the laser ignition device of the engine cylinder is degraded. In any or all of the preceding examples, additionally or optionally, the method further comprises maintaining a misfire threshold of the cylinder when the laser ignition device is indicated to not be degraded; and adjusting the misfire threshold of the cylinder when the laser ignition device is indicated to be degraded. In any or all of the preceding examples, additionally or optionally, the method further comprises sealing the engine cylinder by spinning the engine, in reverse, unfueled, via an electric motor to a position where each of an intake valve and an exhaust valve of the cylinder is closed. In any or all of the preceding examples, additionally or optionally, unfueled reverse engine spinning includes spinning the engine via the motor in a direction opposite to the direction of fueled engine rotation and engine cranking, the engine spun in reverse at an engine speed lower than an engine cranking speed.

In yet another representation, the engine is coupled in a hybrid vehicle system having autonomous capabilities. In the preceding example, the controller may operate the vehicle system in the autonomous mode, and while operating in the autonomous mode, the controller may initiate one or more of the intake air temperature and exhaust temperature based diagnostic of the laser ignition system.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
spinning an engine in reverse, unfueled, to establish a baseline intake air temperature and then sealing a cylinder at a position of negative valve overlap;
operating a laser ignition device in the sealed cylinder;
spinning the engine in reverse, unfueled, to unseal the cylinder; and
diagnosing the laser ignition device based on a change in measured intake air temperature relative to the baseline intake temperature.

2. The method of claim 1, wherein the diagnosing includes:
responsive to the measured intake air temperature exceeding the baseline intake air temperature by a threshold, indicating that the laser ignition device is not degraded; and
responsive to the measured intake air temperature not exceeding the baseline intake air temperature by the threshold, indicating that the laser ignition device is degraded.

3. The method of claim 2, further comprising selecting the threshold as a function of ambient conditions including ambient humidity.

4. The method of claim 3, wherein the threshold is decreased from a nominal value as the ambient humidity increases.

5. The method of claim 2, further comprising: responsive to the indicating that the laser ignition device is degraded, adjusting a misfire threshold of the cylinder.

6. The method of claim 2, wherein the cylinder is a first cylinder of the engine and wherein indicating that the laser ignition device is degraded includes setting a diagnostic code with a unique identifier for the first cylinder.

7. The method of claim 6, further comprising, after the indicating, re-spinning the engine in reverse, unfueled, to reestablish the baseline intake air temperature and then diagnosing a second cylinder.

8. The method of claim 1, wherein spinning the engine in reverse, unfueled, includes spinning the engine via an electric motor in a direction opposite to the direction of engine rotation during cranking and during fueled engine rotation, the electric motor including a starter motor and a hybrid vehicle driveline motor.

9. The method of claim 1, wherein spinning the engine in reverse, unfueled, includes:
initially spinning the engine in reverse at a first speed for a first duration to establish the baseline intake temperature;
then spinning the engine in reverse at a second speed, lower than the first speed, and for a second duration, smaller than the second duration to seal the cylinder by moving to the position of negative valve overlap; and
then spinning the engine in reverse at the second speed for a third duration, smaller than the second duration, to unseal the cylinder by moving to another position where at least an intake valve is open.

10. The method of claim 1, wherein the intake temperature is measured via an intake air temperature sensor coupled to an air intake passage of the engine.

11. The method of claim 1, wherein spinning the engine in reverse, unfueled, includes waking up an engine controller and spinning the engine in reverse after a threshold duration has elapsed since an engine key-off event.

12. A method for an engine, comprising:
operating the engine in a vehicle;
operating the vehicle to drive in an autonomous driving mode; and while doing so:
operating a laser ignition device in a sealed, unfueled engine cylinder after an engine key-off;
during a first condition, comparing a measured exhaust temperature after the operating to a baseline exhaust temperature established via unfueled engine spinning;
during a second condition, comparing a measured intake temperature after the operating to a baseline intake temperature established via the unfueled engine spinning and
during both the first and second condition, diagnosing the laser ignition device based on the comparing.

13. The method of claim 12, wherein the during the first condition, the baseline exhaust temperature is established by spinning the engine unfueled via a motor in a first direction, and the measured exhaust temperature is measured via an exhaust temperature sensor, and wherein during the second condition, the baseline intake temperature is established by spinning the engine unfueled via the motor in a second, direction, opposite the first direction, and the measured intake temperature is measured via an intake air temperature sensor.

14. The method of claim 12, wherein the comparing includes calculating a difference between the measured exhaust temperature and the baseline exhaust temperature during the first condition, calculating a difference between the measured intake temperature and the baseline intake temperature during the second condition, and comparing the difference to a threshold, the threshold adjusted as a function of ambient humidity.

15. The method of claim 14, wherein the diagnosing includes indicating that the laser ignition device of the engine cylinder is not degraded when the difference is higher than the threshold, and indicating that the laser ignition device of the engine cylinder is degraded when the difference is lower than the threshold, the method further comprising maintaining a misfire threshold of the cylinder when the laser ignition device is indicated to not be degraded; and adjusting the misfire threshold of the cylinder when the laser ignition device is indicated to be degraded.

16. The method of claim 12, further comprising, before operating the laser ignition device, sealing the engine cylinder by spinning the engine, unfueled, via the motor to a position where each of an intake valve and an exhaust valve of the cylinder is closed, and after operating the laser ignition device, during the first condition, spinning the engine, unfueled via the motor to a position where the exhaust valve of the cylinder is open, and during the second condition, spinning the engine, unfueled via the motor to a position where the intake valve of the cylinder is open.

17. An engine system, comprising:
an engine including a cylinder;
a laser ignition device coupled to the cylinder;
an intake air temperature sensor coupled to an intake passage of the engine;
an electric motor; and
a controller with computer-readable instructions stored on non-transitory memory for:

waking up a powertrain control module from a sleep mode when a threshold duration has elapsed following an engine key-off;

spinning the engine, unfueled via the motor, to establish a baseline intake air temperature;

sealing the cylinder by spinning the engine, unfueled via the motor, to a position where all cylinder valves are closed;

operating the laser ignition device in the sealed cylinder for a duration;

unsealing the cylinder by re-spinning the engine, unfueled via the motor, to a position where at least an intake valve is open; and diagnosing the laser ignition device by comparing an intake air temperature measured after the operating with the baseline intake air temperature.

18. The system of claim 17, wherein spinning and re-spinning the engine unfueled via the motor includes spinning the engine in reverse, in a direction opposite to the direction of fueled engine rotation, the engine spun in reverse at an engine speed lower than an engine cranking speed.

19. The system of claim 17, further comprising a humidity sensor for estimating an ambient humidity, wherein the comparing includes comparing a difference between the measured intake air temperature and the baseline intake air temperature to a threshold based on an estimated ambient humidity, and wherein the diagnosing includes indicating that the laser ignition device is degraded when the difference is higher than the threshold.

20. The system of claim 18, wherein the controller includes further instructions for, responsive to the indicating that the laser ignition device of the cylinder is degraded, during a subsequent engine restart from rest, disabling fueling and operation of the laser ignition device of the cylinder, and adjusting a misfire threshold of the cylinder.

\* \* \* \* \*